(12) United States Patent
Mistry

(10) Patent No.: US 9,202,194 B1
(45) Date of Patent: Dec. 1, 2015

(54) TRACKING THE DISTRIBUTION OF A PRODUCT OR PACKAGE THROUGH A SUPPLY CHAIN TO DETERMINE AUTHENTICITY AND DETECT BREACHES

(75) Inventor: Rahul Mistry, Gladwyne, PA (US)

(73) Assignee: GlobalSubmit, Inc., Philadelphia, PA (US)

( * ) Notice: Subject to any disclaimer, the term of this patent is extended or adjusted under 35 U.S.C. 154(b) by 895 days.

(21) Appl. No.: 13/415,222

(22) Filed: Mar. 8, 2012

Related U.S. Application Data

(60) Provisional application No. 61/450,427, filed on Mar. 8, 2011.

(51) Int. Cl.
*G06Q 30/00* (2012.01)
*G06Q 10/08* (2012.01)

(52) U.S. Cl.
CPC .................................. *G06Q 10/0833* (2013.01)

(58) Field of Classification Search
CPC .................................................. G06Q 10/0833
See application file for complete search history.

(56) References Cited

U.S. PATENT DOCUMENTS

| | | | |
|---|---|---|---|
| 2006/0015536 A1 | 1/2006 | Buchanan et al. | |
| 2008/0093448 A1* | 4/2008 | de la Huerga | 235/385 |
| 2008/0109411 A1 | 5/2008 | Young et al. | |
| 2009/0112610 A1 | 4/2009 | Simons et al. | |
| 2011/0016318 A1* | 1/2011 | Syngkon et al. | 713/170 |
| 2011/0225100 A1 | 9/2011 | Sangal et al. | |
| 2011/0247960 A1 | 10/2011 | Gogo et al. | |

* cited by examiner

*Primary Examiner* — Allen J Jung
(74) *Attorney, Agent, or Firm* — Panitch Schwarze Belisario & Nadel LLP

(57) ABSTRACT

Distribution of a product or package is tracked through a supply chain having multiple entities that successively receive the product or package. A unique device identifier is associated with each of the supply chain entities and identifies a device that the supply chain entity uses to communicate with an administration computer. The supply chain entities electronically communicate to the administration computer via the device whenever the supply chain entities send a product or package to a successive supply chain entity in the supply chain or receive a product or package from a previous supply chain entity in the supply chain. The communication includes the unique device identifier of the supply chain entity, the unique product or package identifier of the product or package being sent or received, and the supplier code that the supply chain entity has received the product or package from, or sends the product or package to.

9 Claims, 24 Drawing Sheets

Product Distribution

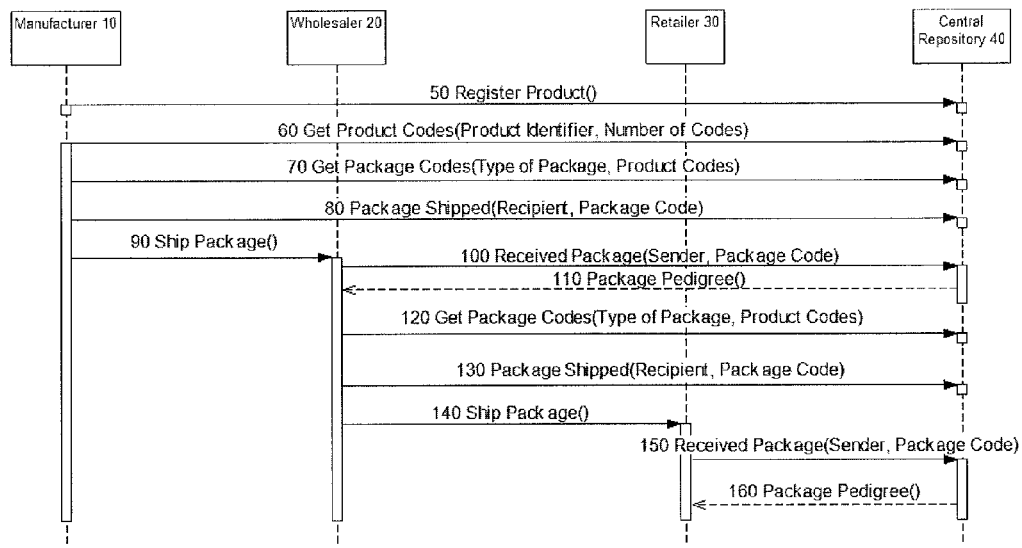
Figure 1: Product Distribution

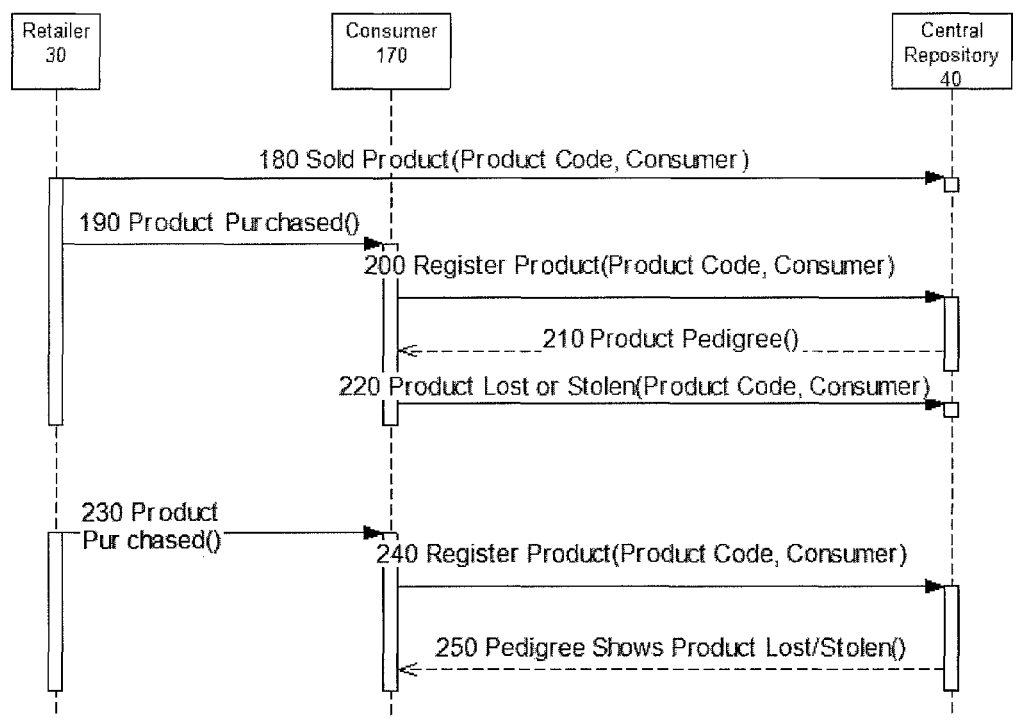
Figure 2: Consumer Purchase of Product

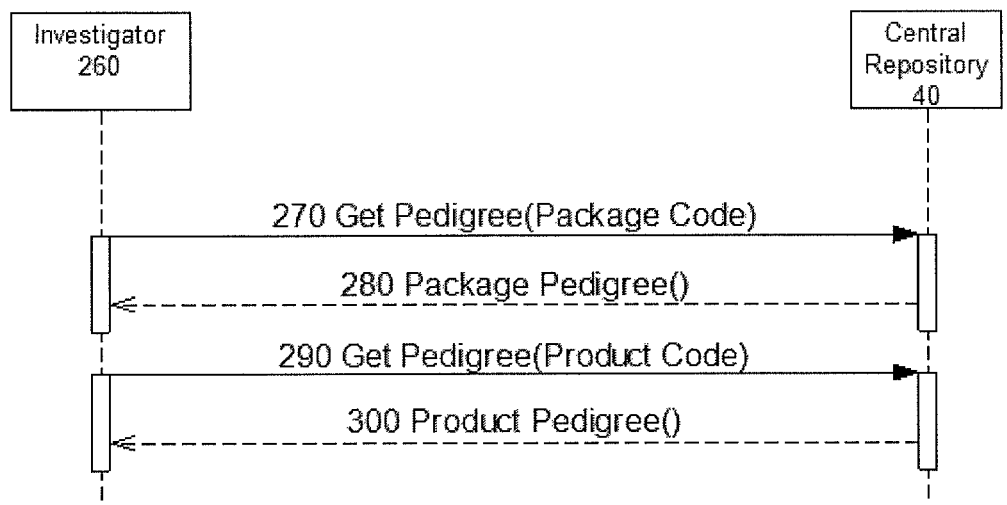
Figure 3: Investigation of Product or Package

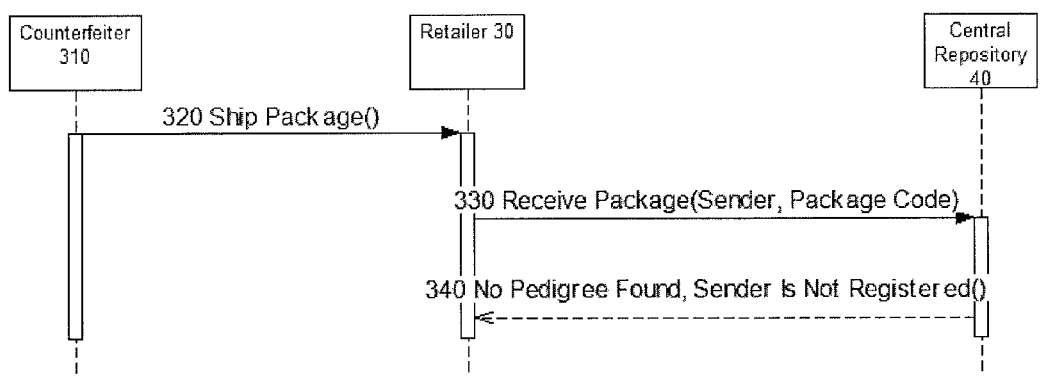
Figure 4: Counterfeit Product

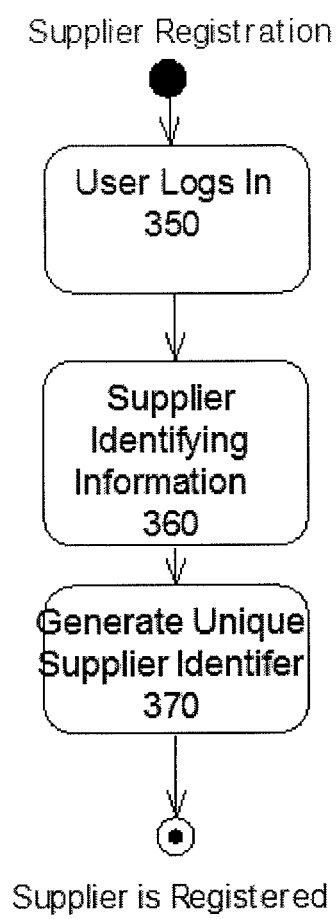
Figure 5: Register Supplier

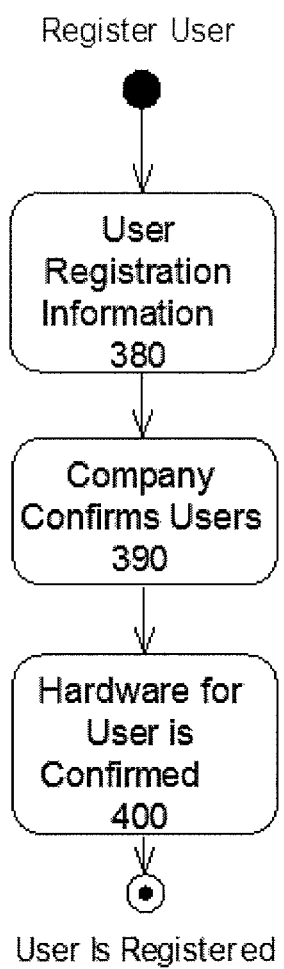
Figure 6: Register User

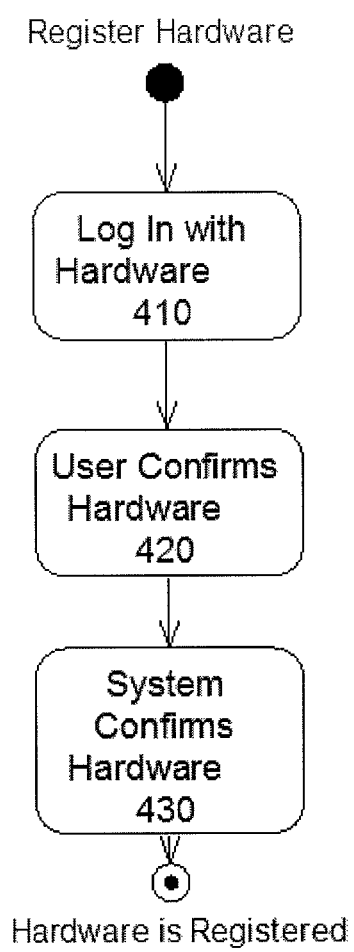
Figure 7: Hardware Registration

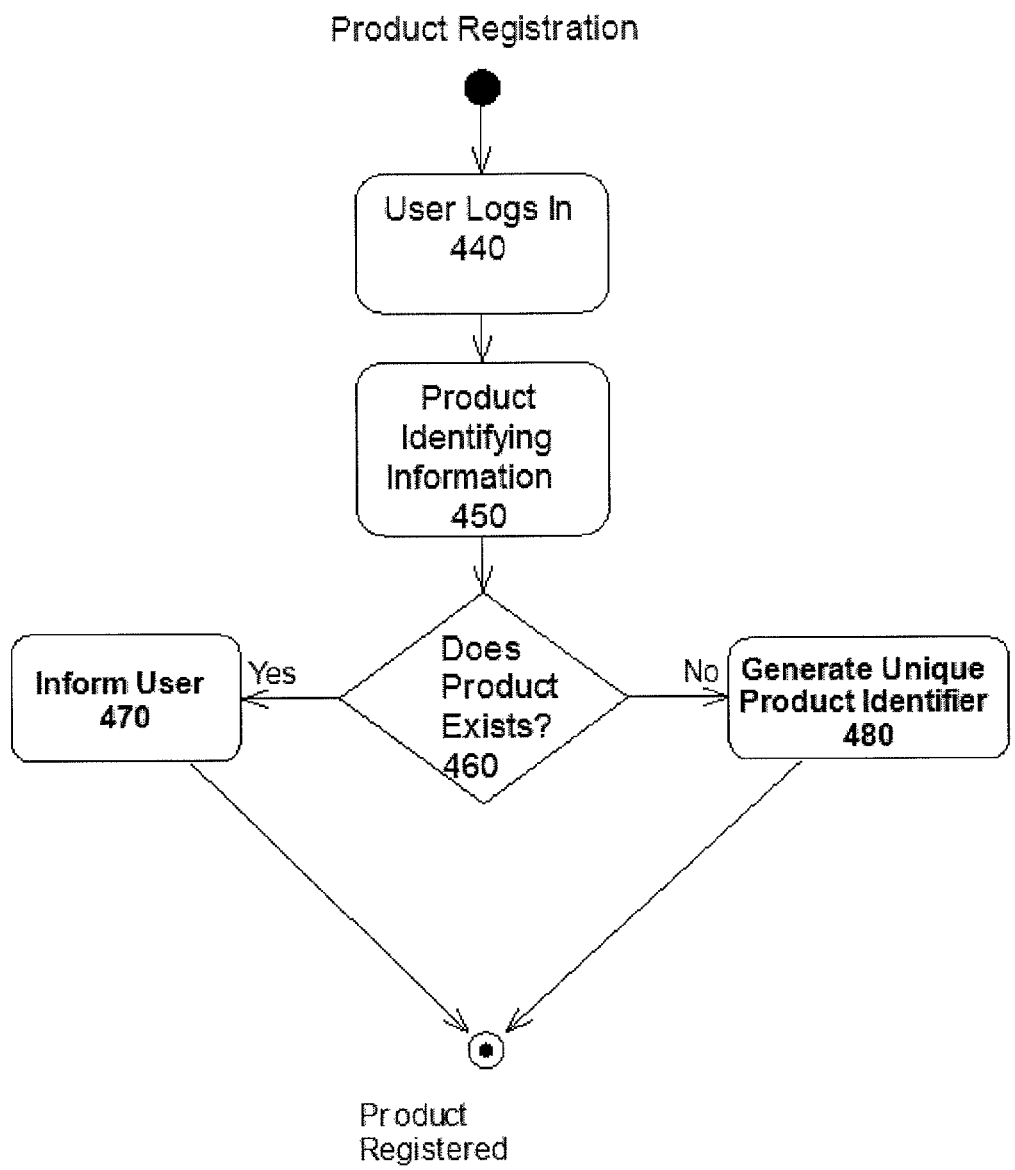
Figure 8: Product Registration

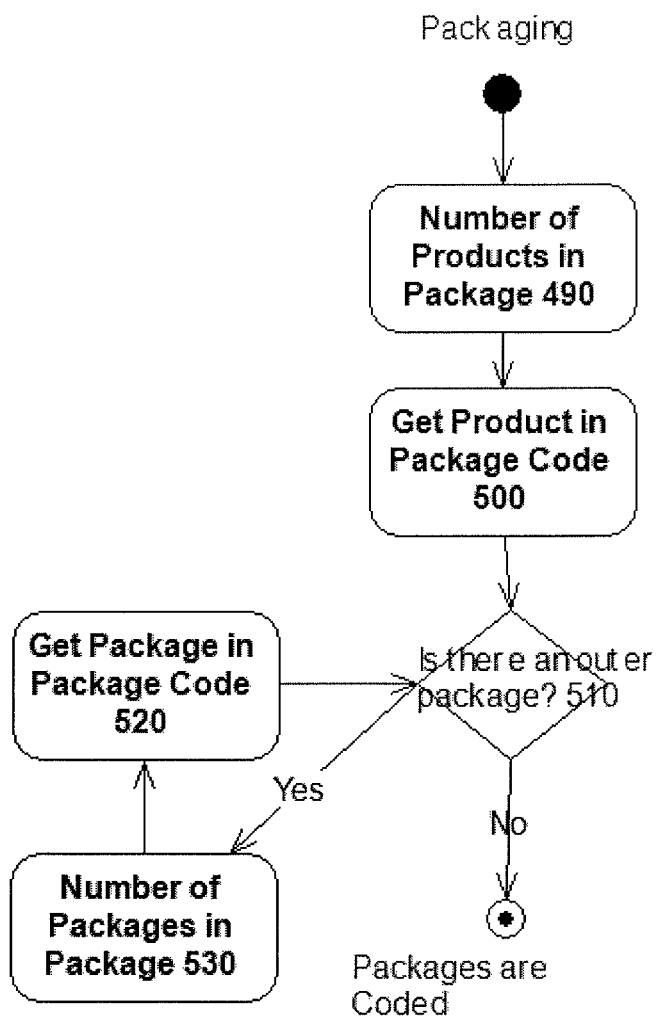
Figure 9: Package Codes

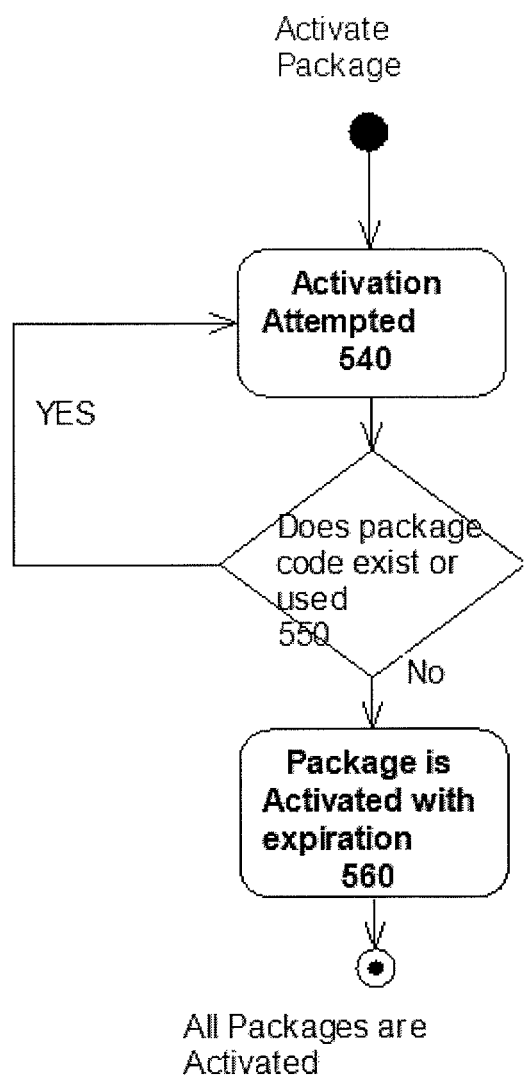
Figure 10: Activate Code

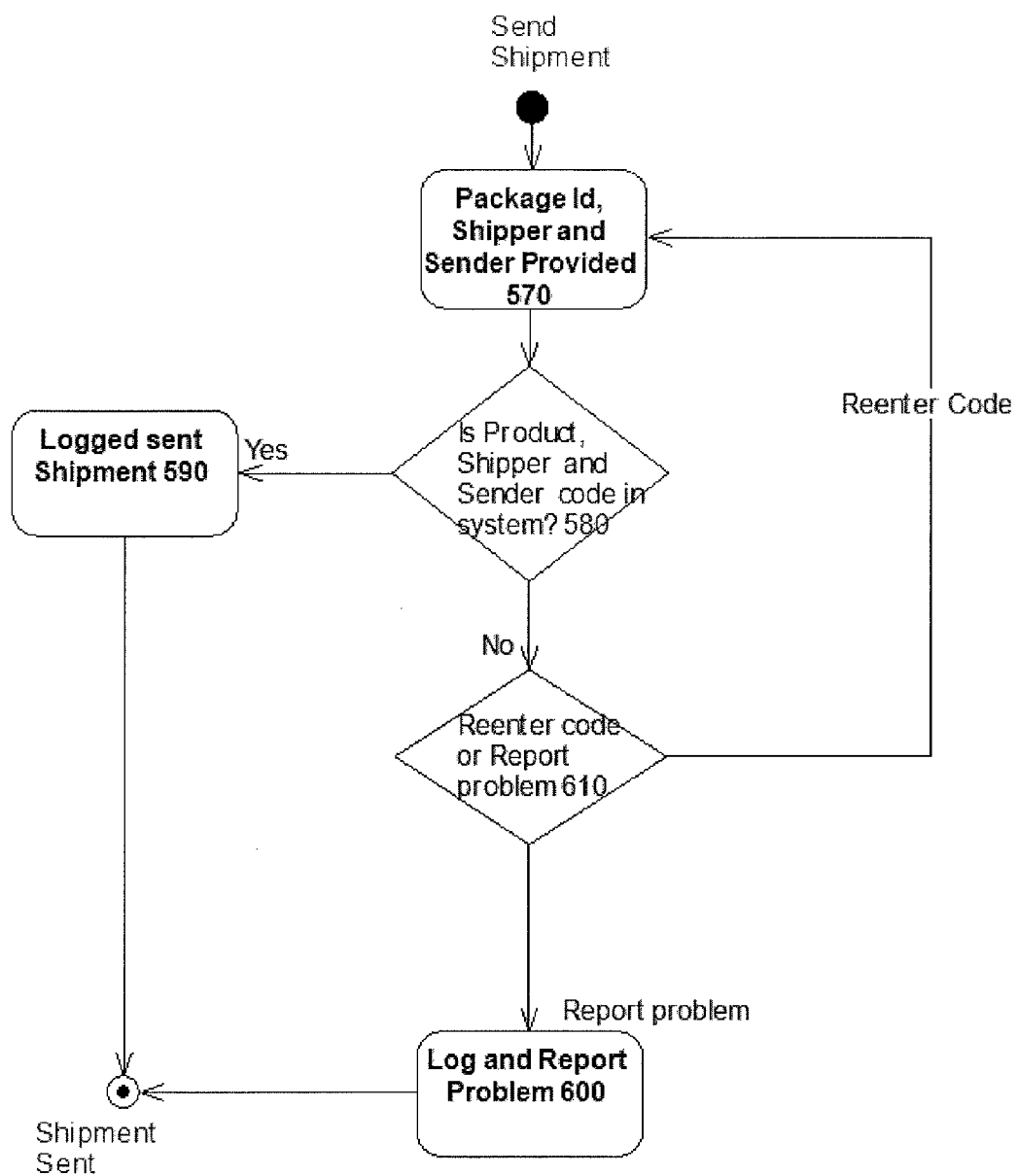
Figure 11: Send Package

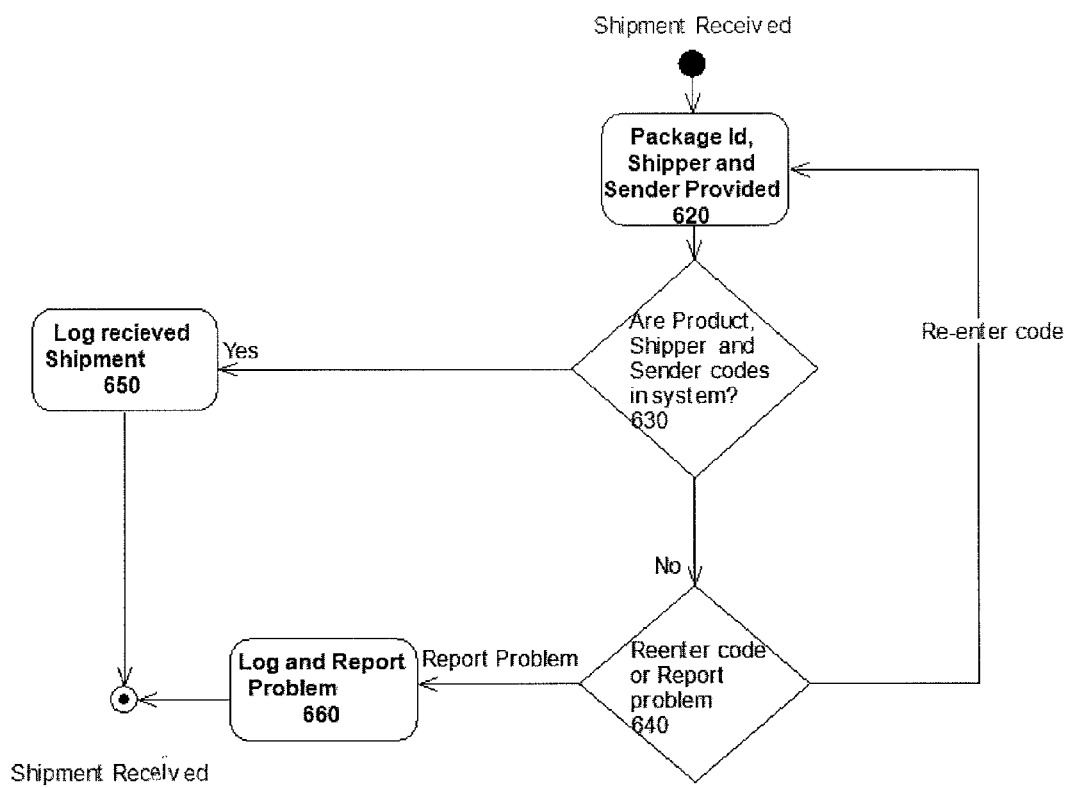
Figure 12: Receive Package

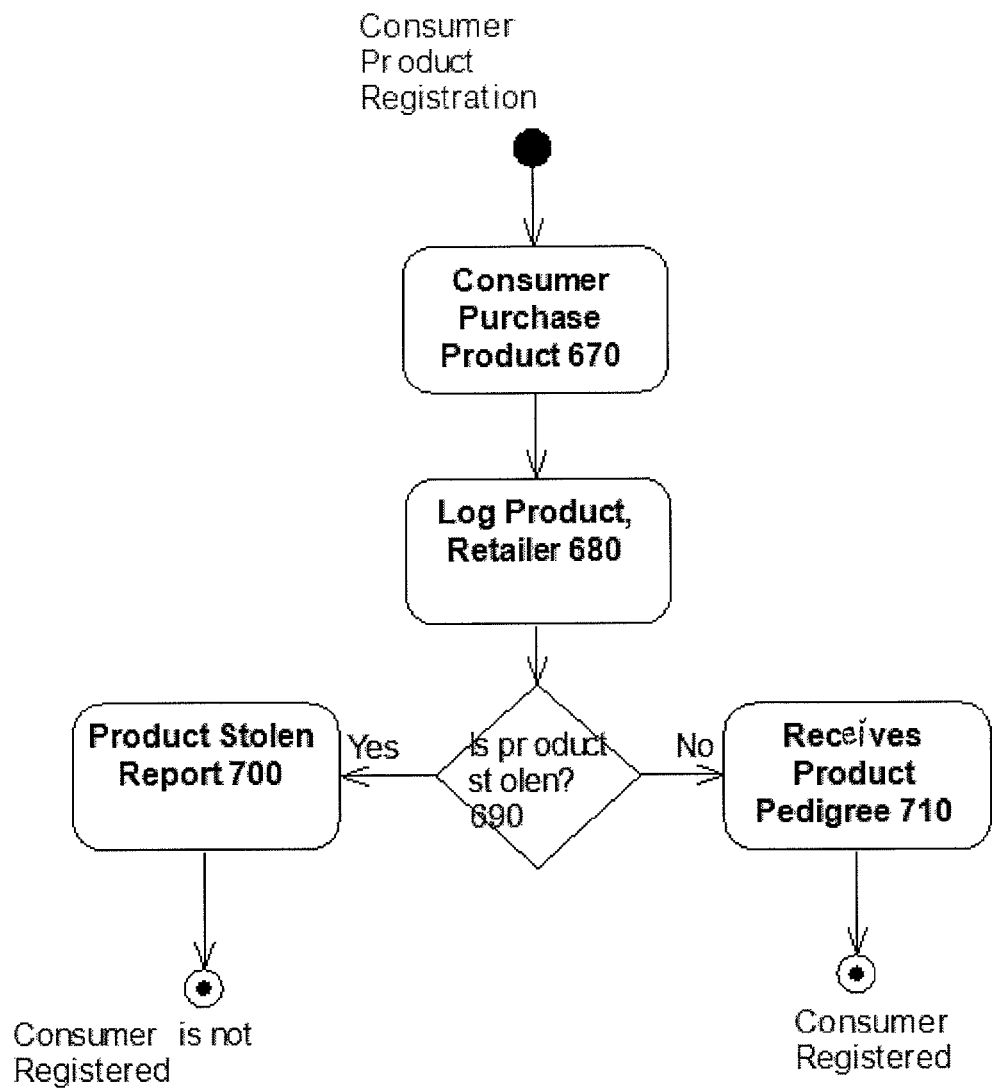
Figure 13: Consumer Product Registration

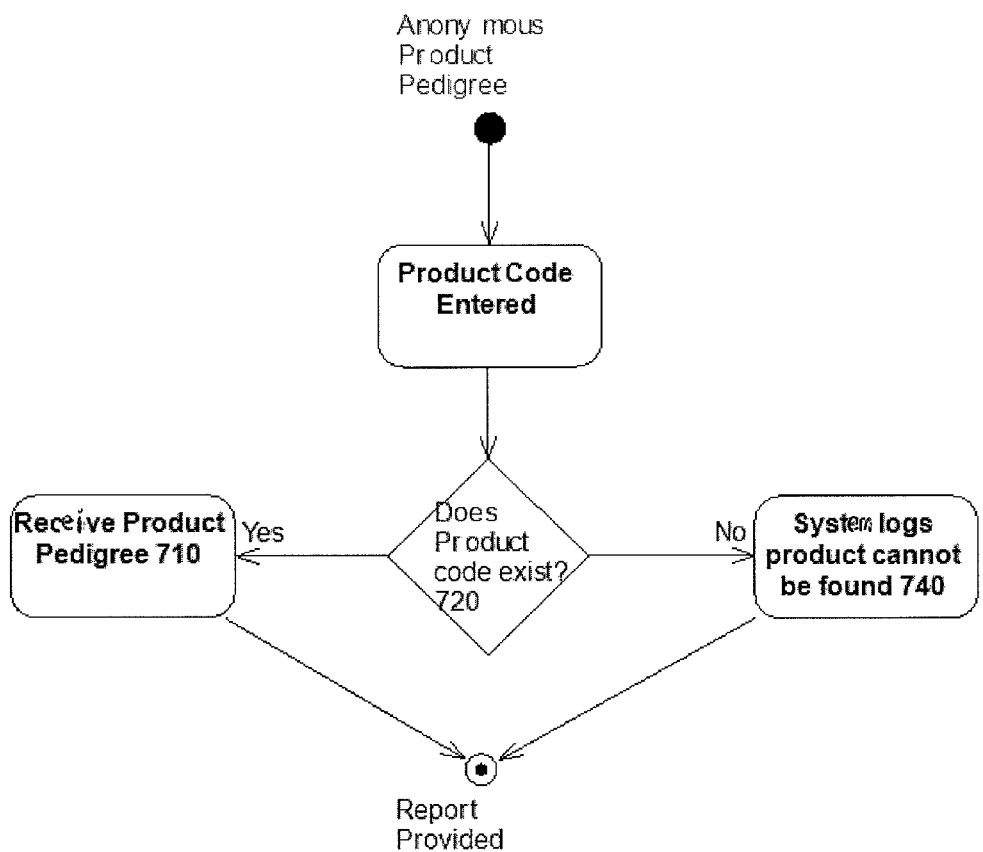
Figure 14: Anonymous Pedigree

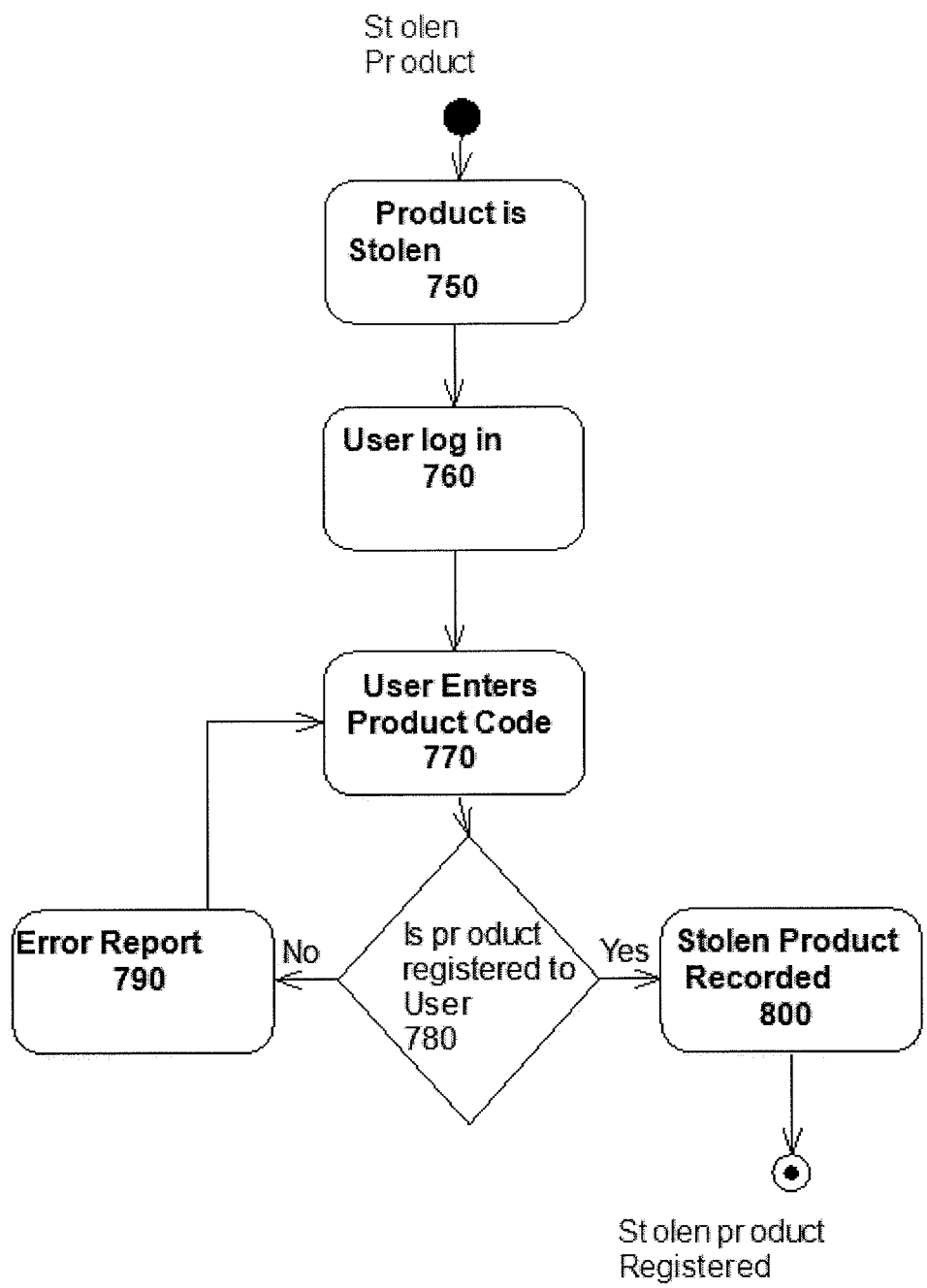
Figure 15: Stolen Product

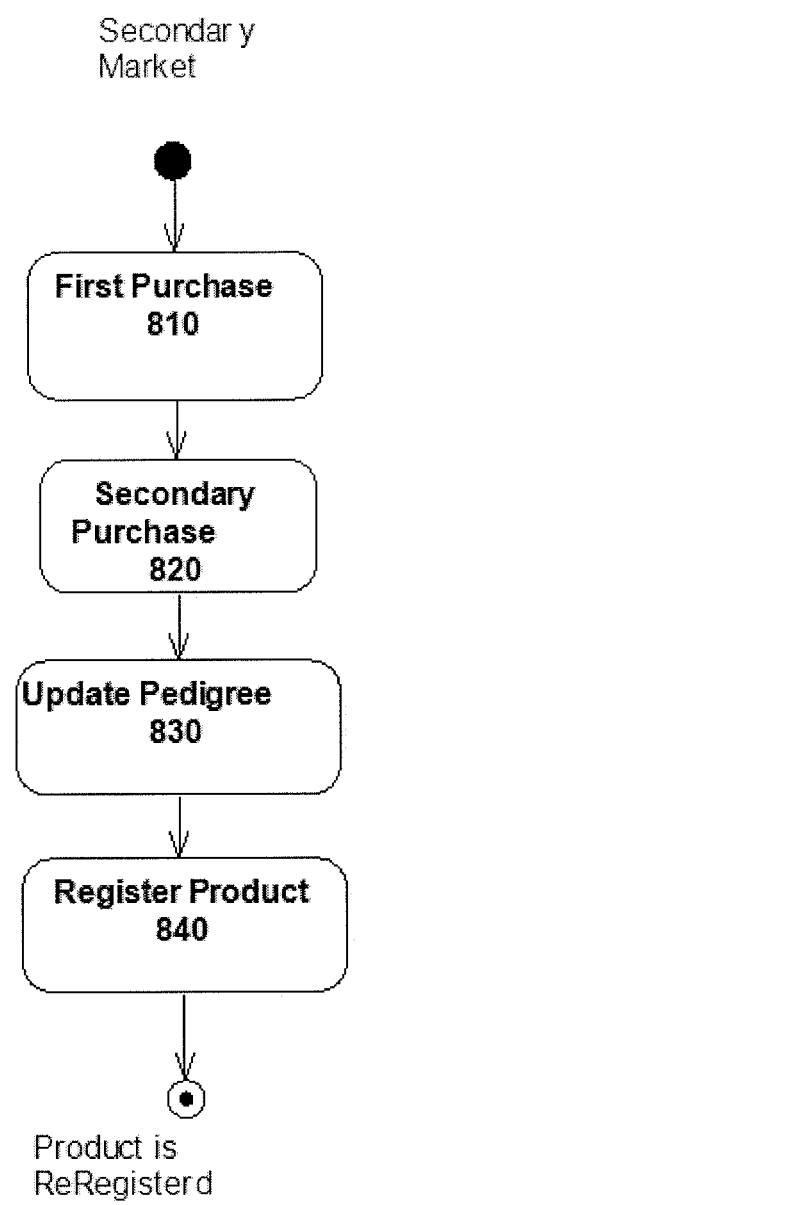
Figure 16: Secondary Market

| Product Code: | 33c5841-5e6d-41b3-8b5a-0f5fb2854c42 | 1010 |
| --- | --- | --- |
| Product Description: | Wonder Drug Auto-Injector (5 ml) | 1020 |

| Sent From | Sent To | Received at | Product/Package Code | Violation |
| --- | --- | --- | --- | --- |
| | | | Product Code Originated at 1 185th Avenue, Oakland CA 94621 | |
| 1 185th Avenue, Oakland CA 94621 | 20 South 22nd Street, Milwaukee WI 53204 | 20 South 22nd Street, Milwaukee WI 53204 | | |
| 20 South 22nd Street, Milwaukee WI 53204 | 60 La Salle St, Chicago, IL 60602 | 60 La Salle St, Chicago, IL 60602 | | |
| 60 La Salle St, Chicago, IL 60602 | 123 Broad St, Philadelphia, PA 19109 | 123 Broad St, Philadelphia, PA 19109 | | |
| 123 Broad St, Philadelphia, PA 19109 | | | | |

| 1030 | 1040 | 1050 | 1060 | 1070 |

Figure 17: Supply Chain Report

| Product Code: | 33c5c841-5e0d-41b3-8b5a-0f5fb2854c42 | | |
|---|---|---|---|
| Product Description: | Wonder Drug Auto-Injector (5 ml) | | |

| Sent from | Sent to | Received at | Product/Package Code | Violation |
|---|---|---|---|---|
| | | | Product Code Originated at 1 185th Avenue, Oakland CA 94621 | |
| 1 185th Avenue, Oakland CA 94621 | 20 South 22nd Street, Milwaukee WI 53204 | 20 South 22nd Street, Milwaukee WI 53204 | | |
| 20 South 22nd Street, Milwaukee WI 53204 | 60 La Salle St, Chicago, IL 60602  *2010* | 123 Broad St, Philadelphia, PA 19109  *2020* | | Product "Received at" a different location than it was "Sent to"  *2030* |
| 123 Broad St, Philadelphia, PA 19109 | | | | |

Figure 18: Supply Chain Report with Violation 1

| Product Code: | 33c5c841-5e6d-41b3-8b5a-0f5f02854c42 |
|---|---|
| Product Description: | Wonder Drug Auto-Injector (5 ml) |

| Sent from | Sent to | Received at | Product/Package Code | Violation |
|---|---|---|---|---|
| | | | Product Code Originated at 1 185th Avenue, Oakland CA 94621 3010 | |
| 1 185th Avenue, Oakland CA 94621 | 20 South 22nd Street, Milwaukee WI 53204 | 20 South 22nd Street, Milwaukee WI 53204 | | |
| 60 La Salle St, Chicago, IL 60602  3020 | 123 Broad St, Philadelphia, PA 19109 | 123 Broad St, Philadelphia, PA 19109 | | Product "Sent from" a location that the product was never "Received at" 3030 |
| 123 Broad St, Philadelphia, PA 19109 | | | | |

Figure 19: Supply Chain Report with Violation 2

| Product Code: | 33c5c841-5e6d-41b3-8b5a-0f5fb2854c42 |
| --- | --- |
| Product Description: | Wonder Drug Auto-Injector (5 ml) |

| Sent from | Sent to | Received at | Product/Package Code | Violation |
| --- | --- | --- | --- | --- |
| | | | 4010 | |
| | | | Product Code Originated at 1 185th Avenue, Oakland CA 94621 | |
| 1 185th Avenue, Oakland CA 94621 | 20 South 22nd Street, Milwaukee WI 53204 | 20 South 22nd Street, Milwaukee WI 53204 | | |
| 20 South 22nd Street, Milwaukee WI 53204 | 60 La Salle St, Chicago, IL 60602 | 60 La Salle St, Chicago, IL 60602 | | |
| 60 La Salle St, Chicago, IL 60602 | 123 Broad St, Philadelphia, PA 19109 | 123 Broad St, Philadelphia, PA 19109 | Product repackaged in a box with 1 other item | 4020 |
| 123 Broad St, Philadelphia, PA 19109 | | | | |

Figure 20: Supply Chain Report with One Repackaging

| Product Code: | 33c5c841-5e6d-41b3-8b5a-0f5fb2854c42 |
|---|---|
| Product Description: | Wonder Drug Auto-Injector (5 ml) |

| Sent from | Sent to | Received at | Product/Package Code | Violation |
|---|---|---|---|---|
| 1 185th Avenue, Oakland CA 94621 | | | Product Code Originated at 1 185th Avenue, Oakland CA 94621 | |
| 1 185th Avenue, Oakland CA 94621 | 20 South 22nd Street, Milwaukee WI 53204 | 20 South 22nd Street, Milwaukee WI 53204 | Product repackaged in a crate containing 100 items  5010 | |
| 20 South 22nd Street, Milwaukee WI 53204 | 60 La Salle St, Chicago, IL 60602 | 60 La Salle St, Chicago, IL 60602 | | |
| 60 La Salle St, Chicago, IL 60602 | 123 Broad St, Philadelphia, PA 19109 | 123 Broad St, Philadelphia, PA 19109 | Product repackaged in a box with 1 other item  5020 | |
| 123 Broad St, Philadelphia, PA 19109 | | | | |

Figure 21: Supply Chain Report with Multiple Repackaging

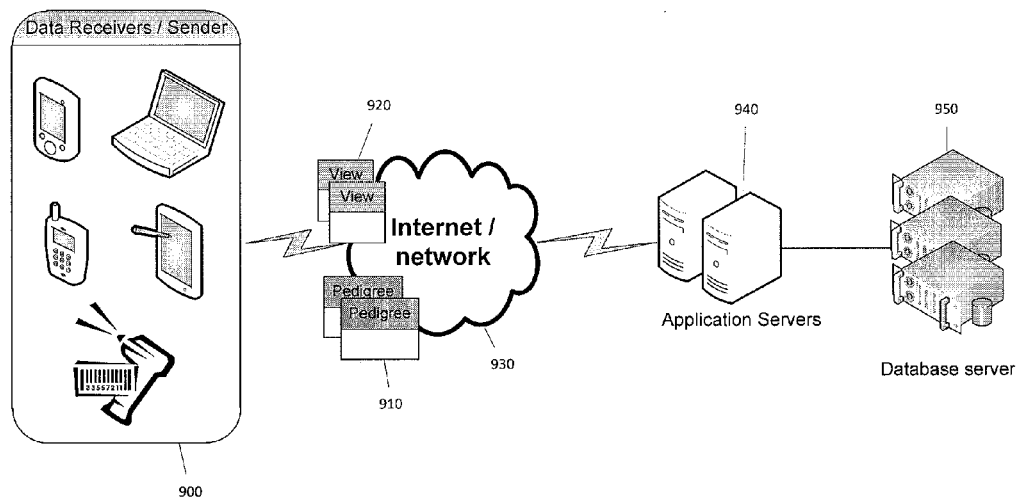
Figure 22: Report of Hardware

6010 Entity: Supplier

| Field | Attribute Type |
|---|---|
| 6020 Supplier Code | UID |
| 6030 Name | Text |
| 6040 Address | Text |

6050 Entity: Device

| Field | Attribute Type |
|---|---|
| 6060 Device Code | UID |
| 6070 Supplier Code | UID |
| 6080 Type | Text |
| 6090 Registered | Boolean |
| 6100 Date Last Used | DateTime |

6110 Entity: Product

| Field | Attribute Type |
|---|---|
| 6120 Product Code | UID |
| 6130 Supplier Code | UID |
| 6140 Description | Text |
| 6150 Date Created | DateTime |

6160 Entity: Package

| Field | Attribute Type |
|---|---|
| 6170 Package Code | UID |
| 6180 Supplier Code | UID |
| 6190 Description | Text |
| 6200 Date Created | DateTime |

6210 Entity: Supply Chain Tracking

| Field | Attribute Type |
|---|---|
| 6220 Supply Chain Tracking ID | UID |
| 6230 Device Code | UID |
| 6240 Supplier Code | UID |
| 6250 Product Code | UID |
| 6260 Package Code | UID |
| 6270 Transaction Type | Text |
| 6280 Sent To Supplier Code | UID |
| 6290 Date Created | DateTime |

Figure 23: Entity Descriptions

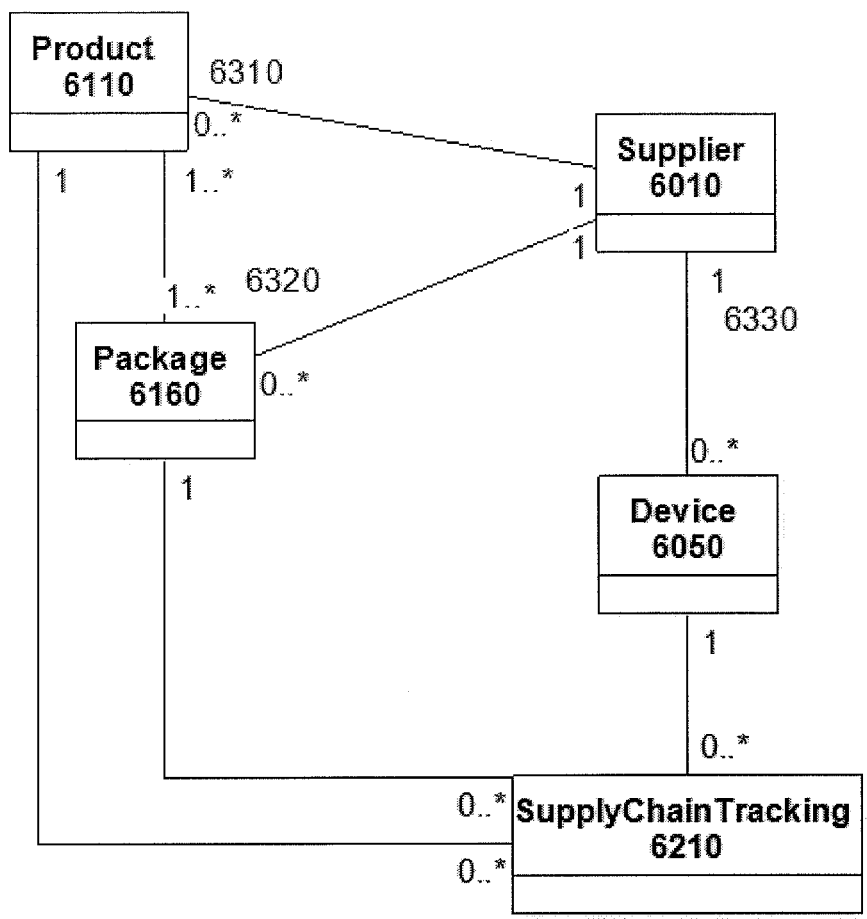
Figure 24: Entity Relationship Diagram

TRACKING THE DISTRIBUTION OF A PRODUCT OR PACKAGE THROUGH A SUPPLY CHAIN TO DETERMINE AUTHENTICITY AND DETECT BREACHES

CROSS-REFERENCE TO RELATED APPLICATION

This application claims the benefit of U.S. Provisional Patent Application No. 61/450,427 filed Mar. 8, 2011, which is incorporated in its entirety herein.

BACKGROUND OF THE INVENTION

Counterfeit products are imitations of an original product usually with the intent to deceive. The detection of counterfeit products is difficult as counterfeiters are highly motivated to not be discovered. While motives of counterfeiters are generally financial, the danger they impose may be greater than just monetary. Take, for example, the counterfeiting of medicines—oftentimes counterfeiters target life-saving medicines to counterfeit because they are lucrative. The counterfeit medicines that enter the supply chain not only undermine the medical system, but they can be dangerous to the people who require the medicines. While some patients may receive ineffective medicines, others may receive ones that are harmful and may even cause death.

Manufacturers have tried many measures to stop counterfeiters, including providing unique packaging, using holograms, micro-printing, and using color-changing inks. Nevertheless, the technology used by counterfeits often overcomes these deterrents and the results are that counterfeit products continue to infiltrate the market.

While some of the potential risks to consumers are discussed above, manufacturers of counterfeit products lose billions in revenue every year and also have their reputations hurt by inferior products entering the market that bear their names. Even suppliers are affected as manufacturers may change their supply chains in attempt to thwart counterfeits adding costs to suppliers and reducing the number of packages and vendors that use their services.

Counterfeiting is a major problem throughout the world and adversely effects affects everyone in the supply chain.

BRIEF SUMMARY OF THE INVENTION

The present invention tracks products from the supplier to the consumer(s) of the product. The supplier adds a specialized code to uniquely identify each product and provides identifying information to a central repository. The specialized codes enable tracking the product throughout the supply chain. Participants within the supply chain are identified as having possession of the product in a specified sequence. When the product code is supplied to the central repository, the pedigree of the product, as well as identifying information from the supplier, can be accessed to authenticate the product. If discrepancies or conflicting information arises, the authenticity of the product is in question.

BRIEF DESCRIPTION OF THE DRAWINGS

Preferred embodiments of the present invention will now be described by way of example with reference to the accompanying drawings:

FIG. 1 shows how a product and package information moves through the supply chain.

FIG. 2 shows how product information updates when a consumer purchases a product and a product is stolen.

FIG. 3 shows the information flow when an inspector is detecting/investigating issues with a product or package supply chain.

FIG. 4 shows the information flow of detecting counterfeit or unregistered products.

FIG. 5 is a workflow of a supplier registration process.

FIG. 6 is a workflow of user registration process.

FIG. 7 is a workflow of a hardware registration process.

FIG. 8 is a workflow to register new types of products.

FIG. 9 is a workflow to receive product and package identifiers (package codes).

FIG. 10 is a workflow to activate package identifiers (activate code).

FIG. 11 is a workflow to send a package and register the package sent.

FIG. 12 is a workflow of receiving a package and registering the package received.

FIG. 13 is a workflow of a consumer purchasing and registering a product (consumer product registration).

FIG. 14 is a workflow of receiving pedigree information from an anonymous user (anonymous pedigree).

FIG. 15 is a workflow for detecting that a product has been stolen.

FIG. 16 is a workflow of a consumer selling a previously purchase product (secondary market).

FIG. 17 shows a Supply Chain Report and provides an example of a supply chain report.

FIG. 18 shows a Supply Chain Report with Violation 1 and provides an example of a supply chain report with a violation detected by the system.

FIG. 19 shows a Supply Chain Report with Violation 2 and provides an example of a supply chain report with a violation detected by the system.

FIG. 20 shows a Supply Chain Report with One Repackaging and provides an example of a supply chain report where a product is repackaged.

FIG. 21 shows a Supply Chain Report with Multiple Repackaging and provides an example of a supply chain report where a product is repackaged more than once.

FIG. 22 shows a sample hardware configuration diagram.

FIG. 23 shows Entity Descriptions that describe the entities and fields of the system.

FIG. 24 shows an Entity Relationship Diagram that depicts the relationship of the entities with one another.

DETAILED DESCRIPTION OF THE INVENTION

Certain terminology is used herein for convenience only and is not to be taken as a limitation on the present invention. For the purposes of explaining the present invention, specific embodiments will be described. These embodiments are exemplary only, and are not intended to limit the scope of the invention.

A. Overview of Preferred Embodiments

I. Registering Components with the System a. User Authentication

Prior to entering the system, authorization/authentication of users is required (FIG. 6: Register User). Typical user information to be captured include name, e-mail address, phone number, and address. There are numerous methods of authentication and any of these methodologies may be used. The purpose of user authentication is to ensure that only users who have been verified and trusted have access to the system. A user is associated to one or more suppliers. The supplier confirms each user.

An example of user authentication is that a prospective user enters information into the system and then a verifying code is sent to the user's e-mail address. Once received, the user will click on a link or enter information into the system that is contained within that e-mail.

Another example is that the system sends an authentication code via SMS to a user's cell phone. Upon receiving the SMS, the user will access the system and provide the information transmitted by the SMS to verify the user. Once a user has been verified by one of these methods, they will be activated in the system. There are many other examples that could be used for authentication activation within the system.

b. Hardware Authentication

Once the user is added to the system, hardware for that user must be authorized as well (FIG. 7: Hardware Registration). Users can authorize hardware by accessing the system with the hardware they wish to verify. The system will generate an access code and provide that information to the user by email, SMS, or another method. This authentication code will then be entered by the user to authenticate and activate the hardware for the user. The hardware is associated to a user and a company/supplier. Anytime that the user uses this hardware, they are automatically tagged to a specific user and supplier. To ensure proper usage, some verification needs to occur before the usage of the hardware. The verification could be entering a PIN, entering a code from an SMS, entering a code from an e-mail or other forms of verifications.

The hardware referred to herein is also interchangeably referred to herein as a "hardware device(s)" or a "device(s)."

c. Supplier Registration

Supplier is a general term to describe a manufacturer, wholesaler, distributor, retailer or other individual who may produce or sell products. Suppliers must enter identifying information such as name, address, location, tax ID, state or federally provided IDs, number employees and revenues (FIG. 5: Supplier Registration). When the system receives information, a unique identifier for that supplier can be created. The system can either automatically add the supplier to the system based on the information provided or an administrator may verify the supplier's information and determine whether or not to approve that supplier. The supplier is informed of their approval.

When a supplier is entered into the system, a unique id or supplier code will be created to identify the supplier. This unique supplier code can be found within the system by searching on the criteria that comprise that user profile such as address, name, a phone number, or Dun & Bradstreet DUNS® number. Furthermore, a quick reference to this supplier code can be create such as a UPC or other type of lookup code which would be very helpful for other users of the system to identify and reference the supplier.

d. Product Design Registration

As used herein, a product design is defined as the idea, plans, schematics, specification, and/or other information that conveys a physical object, service or idea. The product design should not be confused with the product instance. As used herein, the product instance is what is produced from the product design. For example, the recipe for a chocolate chip cookie would be the product design, while the actual cookie would be the product instance.

There are many types of product designs that may be used, and the type of product design used would change depending on the type of product instance that is to be created. For example, pharmaceutical products in the U.S. are described using a standard called Structured Product Labeling (SPL). A drug (medication) manufacturer may describe a drug pill's product design by providing the amounts of active ingredients, inactive ingredients, color, size, shape, etc. Each time a drug manufacture creates a new physical pill that would be a product instance.

Each product design will be registered into the system. Once a profile has been created for the product, the supplier will be informed of a completed registration.

To continue the example, a drug manufacturer may have two product designs for ibuprofen with the only difference being the amount of active ingredient (e.g., one pill may have 200 mg of ibuprofen and the other pill may have 600 mg). Therefore, two separate product designs are entered into the system. The manufacturer may produce millions of product instances for each product design.

The product design is entered in to the system (FIG. 8: Product Registration) with all of the necessary identifying characteristics. Often dimensions and a photograph of the product are included in the product registration.

e. Package

A package is created by grouping one or more product instances. Packages can also consist of other packages.

For example, a drug manufacturer may put 20 ibuprofen pills into a bottle to create one package. This is a package created by 20 products instances, in this case, ibuprofen pills. Next, the manufacturer may pack 100 bottles into a box. The box is a package consisting of 100 other packages, in this case the bottle of 20 ibuprofen pills. Finally, the manufacturer, may place 10 boxes into a crate. The crate is a package consisting of 10 other packages, in this case the box of ibuprofen bottles.

Packages that are sold to consumers are entered into the system with appropriate information to accurately define the package such as the type and number of product instances (FIG. 9: Package Code). For example, the bottle of 20 ibuprofen pills may be registered into the system since it will be used many times by the supplier. If a product is a larger package (e.g., 10 bottles of 20 ibuprofen pills in one bottle), both the product and package would receive a code (e.g., a code for the package of the 10 bottles and 10 codes for each bottle). If there are outer packages (e.g., 50 boxes to a crate), the outer package would also receive a code.

f. Identifying Code

A unique code will be used to identify product instances and/or packages within the system. A unique code may be created by a number of different methods. Some popular methods include GUID (globally unique identifier), OID (object identifier), UUID (universally unique identifier), and SID (security identifier). The present system does not depend on a specific type of unique identifier.

g. Identifying Code Requests

When a supplier is ready to create new product instances or packages (e.g., a bottle of ibuprofen pills), they will request new identifying codes from the system. The supplier will tell the system the product being produced and the number of products codes requested. The supplier will also provide other information such as lot number, expiration date, number of items in a package, size, and weight. The system stores this information, then creates and delivers identifying codes for the product instances or packages to the supplier.

h. Applying and Activation Identifying Codes

Suppliers assign identifying codes for a product instance or package. The assignment enables each product instance or package to carry this identifying code so the identifying code can be revealed to the possessor of the product instance or package. The application of the identifying code can be achieved in many ways, including printing on the product instance or package, attaching a UPC, embedding an RFID tag, and etching.

Upon applying identifying codes, the supplier confirms to the system that identifying codes have been applied to specific product instances or packages (FIG. 10: Activate Codes). The system makes a note of these codes and activate them within the system. Suppliers can also inactivate or invalidate unused identifying codes that it obtained from the system. Unused codes that are not activated before the expiration date will expire and will no longer be valid within the system.

i. Identifying Code Expiration

For each identifying code that is created by the system, an expiration date on the code will be set. If the identifying code is not activated prior to the expiration date, the identifying code will be deactivated and is no longer valid in the system. A supplier or packager can enter the system and reactivate a code that has expired. An example of this situation would be that a supplier inadvertently allowed a code to expire.

j. System Access Modes

The user's purpose for accessing the system will determine the access mode to the system. There may be many access modes to the system including, but not limited to, manufacturer, shipper, receiver, consumer and inspector. The system access mode may change how the system records, responds to, or interacts with a request. In general, the system access modes allow for numerous interpretations and processes to occur from one or more criteria. Therefore, the system is able to respond to an inspector differently then it would to a consumer. There are many ways this can be done including, but not limited to, providing different SMS numbers to system users dependent on their role, providing PIN numbers to users and having a phone system route calls depending on which menu items are selected. An example of system modes is as follows: Several SMS numbers may access the system, however, each SMS number is assigned to a specific role, such as an inspector. When an inspector accesses the system by sending a message to that SMS number, the system knows that the message sender is an inspector since they used the inspector only SMS number. Furthermore, the system can identify the specific inspector by matching the message senders SMS number to registered users. The system will look up the SMS number and verify that the user is in fact an inspector, and has access to the system and associated functions for an inspector.

II. Tracking Identifying Codes

The present invention involves how identifying codes are tracked. The supply chain may consist of many stops from the initial supplier to the final consumer of the product instance or package. Within the system, the users of the system, suppliers, and the hardware they have used have all been identified and registered. In addition, the identifying codes have been recorded with the corresponding product design, product instance, and/or package.

At each point in the supply chain, the identifying code will be provided by the sender and receiver with a specific system access mode (FIG. 11: Send Package) (FIG. 12: Receive Package). The amount of information that must be entered at each stop in the system is limited to the identifying codes. This is true because the supplier, users, and hardware used to provide the identifying code have already been registered with the system. In addition, the system access mode utilized provides additional information to the system.

Therefore, by simply providing the identifying code to the system with the registered hardware, the system can determine who and where the identifying code is currently located, the last shipper and receiver of the product instance or package, and other information based on the system's current records. Thus, the transmission of information and supply chain tracking is greatly simplified because all of the components of the supply chain have been registered and compliance to the system and accurate tracking is made much easier.

One example of how tracking the identifying codes can be achieved is as follows:

A shipper uses a registered piece of hardware that is a combination UPC reader and SMS transmitter to scan a UPC identifying code on a package and a UPC supplier code that represents the receiver who is also registered in the system. The hardware is set to shipper mode which has a pre-programmed number to send SMS messages to the system. Upon scanning the UPC representing the identifying code and the UPC representing the supplier code, the hardware obtains the identifying code of the package and the supplier code of the intended receiver and transmits them to the pre-programmed SMS number for the system. When the system receives the identifying code and supplier code from the registered hardware, the system recognizes the SMS caller and determines who is the shipper and their location, as well as where the intended receiver is and their location. Furthermore, the system uses the identifying code to determine what is being shipped, along with the product designs, manufacture information, and the like. Once the package arrives at the receiver, the receiver will use a similar scanner and transmit the identifying code and a supplier code that represents the shipper. Thus, with a few scans at each location, the entire supply chain pedigree can be established.

a. Shipment Sent

A product instance or package may be shipped to numerous locations along the supply chain before it reaches the final consumer. Each time the product instance or package is shipped, the shipper provides the identifying code and the intended receiver to the system. Other information is also provided, actively or passively, such as the date, and the hardware used.

b. Shipment Received

A product instance or package may be received at numerous locations along the supply chain before it reaches the final consumer. Each time the product instance or package is received, the receiver provides the identifying code and the shipper to the system. Other information is also provided, actively or passively, such as the date, and the hardware used.

After receiving product and package codes from the receiver, the system will provide the pedigree to the receiver who can then verify if the information is correct.

In addition, packages and products can be repackaged. For example, a crate might contain 50 boxes. Any box can be sent to any trading partner. Also, multiple boxes can be repackaged in a larger box. That larger box would receive an additional code for tracking (FIG. 1: Product Distribution) (FIG. 20: Supply Chain Report with One Repackaging) (FIG. 21: Supply Chain Report with Multiple Repackaging).

c. Consumer Purchase

Once the consumer purchases a product instance or package, the consumer may send the identifying code to the system anonymously. The anonymous access to the system by consumer is important to protect the privacy of the consumer. To accommodate this anonymous access and provide consumers with limited information, a specific system access mode exists for consumers that are different than that of suppliers, wholesalers, retailers, and inspectors. Thus, users who access the system in the consumer access mode will be recognized as just that, consumer, and will receive the limited information allowable for that access code. Upon receiving the identifying code from the consumer, the system will return product design information that was registered in the system by the supplier, product instance information, the identifying code pedigree, and the confidence of the authenticity of the product as determined by the supply chain pedigree purity (FIG. 14: Anonymous Pedigree). In addition, the system will record that fact that the identifying code has been entered utilizing the consumer access mode. This point is crucial as repeated entries of the same identifying code by different consumers is likely caused by identifying codes that have been copies and reprinted many times by wrongdoers. Thus, if an identifying code is entered numerous times, consumers and/or other appropriate persons can be warned of this security breach.

d. Consumer Registration

Many suppliers and retailers request that consumers of their products register their products with them. This registration serves many purposes including activating warranties, verifying authorized users, and providing marketing demographics. This system can be used replace such consumer registration systems.

When consumers access the system and provide an identifying code, the system can query the user whether they would like to register the product. If the consumer chooses to register the product then they will provide the typical registration information, such as name, address, phone number, e-mail, and fax. By registering themselves, consumers are no longer anonymous. However, they benefit from the registration by being allowed access to other features of the system including, but not limited to, detecting stolen goods and verification of their ownership. Once submitted, the system will then know who the rightful owner of the product is (FIG. 13: Consumer Product Registration).

e. Inspector Pedigree Request

Users of the system who are identified as inspectors can enter identifying codes into the system utilizing a different system access mode (FIG. 3: Investigation of Product or Package). The system authenticates and verifies the user as an inspector, their hardware, and their right to use the system access mode. After authorization, the system will send the product instance or package pedigree information, as well as any other identifying information for these identifying codes. This information will help inspectors identify any anomalies with the product and potentially detect illegal supply chain activities.

f. Consumer Purchases Used Product

Secondary markets for used products exist for many items (FIG. 16: Secondary Market). When a consumer chooses to buy a product from another consumer who possesses that product, the system can change ownership for the product (FIG. 2: Consumer Purchase of Product). The new purchaser of the product can enter the identifying code into the system. The system can verify the good is authentic by matching the identifying code with the records, and also provide a description and the pedigree to allow the purchaser to verify that they are purchasing and authentic product from the rightful owner.

III. Detection

By tracking the components of the supply chain, the system can analyze this information and determine the authenticity of products while also detecting suspicious activities and pinpoint when counterfeit items enter the supply chain (FIG. 4: Counterfeit Product). By matching the shipping and receiving records within the system, a full supply chain pedigree can be created (FIG. 17: Supply Chain Report). Any conflict information between the shipper's intended recipient and the actual recipient of the product or package, hardware used, or any other information that is tracked will be identified as anomalies (FIG. 18: Supply Chain Report with Violation 1) (FIG. 19: Supply Chain Report with Violation 2). Sophisticated signal detection routines will be used to analyze the dates. The system will then be programmed to notify the appropriate persons of any suspicious activities that have been detected.

a. Detecting suspicious activities

This scenario covers suspicious activities and potential counterfeit product instances/packages that enter the supply chain at any level, including the manufacturer, supplier, wholesaler, distributor, or retailer. When the counterfeit product instance or package is physically received, the corresponding identifying code will be entered in to the system by the receiver. The system will detect the product in one of several states:

i. Identifying code is not found—this would occur if the counterfeiter generated their own product code. Since the code was not generated by the system, it will not match the system's records.

ii. Identifying code not activated—this would occur when a product code is entered into the system that has been generated by the system but the supplier never activated that code. This measure protects the system from stolen codes.

iii. Identifying code expired—this would occur when a product code was generated by the system but the product was not activated within a specified time by the supplier. This measure protects the system from unused codes being stolen.

iv. Identifying code found, not shipped—this would occur when a product code was generated by the system and is activated by the supplier but the supplier has not yet shipped the product. This measure protects the supply chain from stolen product as well as stolen codes.

v. Identifying code found, already used—this would occur when a code previously generated by the system has been activated, but the code has since been sold to a consumer. Therefore, the second instance of this code being used is likely caused by the counterfeit product reusing an existing code.

vi. Identifying code found, sender and receiver information do not match—this would occur any time the sender's information before they were shipping a product or package does not match the receiver's information of where the product or package was shipped from. This case would also cover an instance when a product is entered into the supply chain without a previous pedigree.

b. Authenticity

This scenario pertains to verifying the authenticity of product instances/packages. When a receiver of product instances/packages enters the identifying code into the system, the system can verify that the identifying code has been generated and activated properly and has not been compromised in any way, such as being duplicated. In addition, the fully supply chain pedigree can ensure that all sender and receiver data match and that no gaps occur in the supply chain pedigree up to the point of the receiver entering the identifying code into the system. In the instance just described, the authenticity of the product instances/packages is very high.

There is likely to be many stops along the supply chain, and 100% compliance is unlikely. Nevertheless, the confidence of authenticity can still remain very high if the data that has been entered has only gaps and no conflicting information. As more and more data is missing or is conflicting, the confidence of authenticity decreases.

c. Lost/Stolen Product/Package

This scenario pertains to particular product instances or packages that are lost or stolen (FIG. 15: Stolen Product). In the occurrence of loss or theft, the user will report identifying code product instances/packages to the system. After the identifying code has recorded as lost or stolen, any future query about that lost or stolen identifying code will trigger a new workflow because the reappearance of the identifying code may help determine who is in possession of the lost or stolen product instance/package and where it might be located (FIG. 2: Consumer Purchase of Product). Upon receiving a query with the lost or stolen identifying codes, the system creates a record and attempts to obtain additional information from the user who entered the identifying code. After collecting information, the system will create a report and notify the appropriate individuals.

B. Detailed Disclosure of Preferred Embodiments

FIG. 1 displays how the product and package information moves through the supply chain starting with the Manufacturer (step 10). As demonstrated, the Manufacturer (step 10) first registers the product (step 50) with the Central Repository (step 40) which in turn generates the Product (step 60) and Package Codes (step 70). The Product and Package Codes are then applied to the products and packages (step 80) so they may be tracked once shipped (step 90) out to the wholesaler (step 20) guaranteeing authenticity.

After receiving the shipped packages, the Wholesaler (step 20) registers the Product and Package codes (step 100) with the Central Repository (step 40) to validate the Packages' pedigree. The central repository (step 40) will report who should have shipped the package (step 110) while also registering the package has arrived its intended destination safely.

Once the received package is confirmed, the receiver may repackage the contents into smaller (or larger) quantities to ready shipment to a retailer. The receiver must then request new package codes (step 120) for the packages they create for shipment, and then notifies the system when the package has shipped (step 130) and to whom. This process provides extra assurance that the products are authentic as they travel through the supply chain.

Once the shipment (step 140) is received by the Retailer (step 30), the Retailer (step 30) will follow the same procedure (step 150) as the wholesaler (step 20) and register the Package codes with the Central Repository (step 40) to further authenticate the validity of the product pedigree (step 160) prior to it being sold to the consumer.

FIG. 2 demonstrates the process followed when a consumer (step 170) purchases a product. As explained in FIG. 1, the Retailer (step 30) will register the product code within the central repository (step 40) upon receiving the shipment from the wholesaler (step 180). This assures the consumer (step 170) that their products have a clear path from the manufacturer all the way through to the retailer (step 30).

Once the consumer (step 170) purchases the product (step 190), the consumer (step 170) has the option to register their product (step 200) with the central repository (step 40). In doing so, the consumer (step 170) denotes that they are the owner of the product and confirms the pedigree (step 210). If the consumer (step 170) has lost the product or believe it has been stolen, the consumer (step 170) can report the lost or stolen status (step 220) to the central repository (step 40).

If the lost or stolen package has a new owner (step 230), and they attempt to register the product (step 240), the central repository will notify the consumer (step 170) that the product cannot be registered because it has been reported to be lost or stolen (step 250), thus invalidating the transfer of ownership.

FIG. 3 illustrates the process Investigators (step 260) follow to investigate a specific product or package. Upon requesting the pedigree by submitting a package code (step 270), the system (step 40) generates the pedigree and sends it back to the investigator (step 280) who can then search for any anomalies or abnormalities in the data that could suggest potential counterfeiting or illegal behavior.

Alternatively, the investigator (step 260) can send the product code (step 290) to the system (step 40) instead of a package code (step 270), and receive the same pedigree information (step 300).

FIG. 4 details the information flow of detecting counterfeit or unregistered products within the supply chain. When a counterfeiter (step 310) ships a package (step 320) to the retailer (step 30), the retailer (step 30) can request the status of the package (step 330) from the central repository (step 40). If the package code is not found, has already been used or if the counterfeiter registration code is not authentic, the central repository (step 40) will return a message (step 340) concerning the inconsistencies in the shipping and/or pedigree information. This message may be sent to a number of types of relevant people including manufacturers, wholesalers, retailers, and consumers through several means of communication such as email, SMS, or generated reports that can be seen upon login to the system.

FIG. 5 illustrates the process taken by the Supplier to properly register with the system. The Suppliers must log into the system (step 350) to provide their appropriate information (step 360). They will be required to enter identifying information such as name, address, location, tax ID, state or federally provided IDs, number of employees, and revenues. The system can either add the Supplier to the system automatically or an administrator can verify the supplier's information. Upon approval, a Unique Supplier Identifier will be assigned (step 370) to the Supplier and they will be officially registered in the system.

FIG. 6 shows the process of a user registering with the system. Prior to entering the system, authorization of a user is required and is obtained through the input of information (step 380) such as name, e-mail address, phone number, and address. The supplier that user is associated to would then need to approve the user being added to account (step 390). Once confirmed, the user will receive an email or SMS with an authentication code which will direct them to a link to verify them in the system (step 400). At this point, they will then be registered users.

FIG. 7 shows the process by which a user registers their hardware within the system. They will initially log into the system with the hardware they wish to register (step 410). This action will generate an access code that will be sent to the user to a device that is not the hardware being registered (e.g., email, SMS, etc.). This authentication code will then be entered into the system to confirm receipt (step 420). After successfully entering the code, the hardware will be registered for that user (step 430) allowing it to be automatically tagged to that user and supplier.

FIG. 8 shows the workflow designed to register new types of products. A registered user will initially log into the system (step 440) and enter in the product design with all of the necessary identifying characteristics (step 450) including things like dimensions and a photograph of the product. The system will check to ensure the product exists within the system (step 460). If the product already exists in the system based on this provided information, the system will inform the user that the product is already registered (step 470). If not, it will automatically generate a unique product identifier (step 480) and register the product in the system. This product identifier may also be sent automatically to other recipients such as a company administrator or relevant personnel within the organization via email or SMS.

FIG. 9 illustrates the workflow for receiving package codes. A product may be placed in a package containing many of those products (e.g., a product may be a bottle of pills and the package is made up of 20 pill bottles). Furthermore, the package may be placed inside a larger package, outer package, containing many of those packages (e.g., the outer package may be a crate consisting of 50 outer packages which consists of 20 pill bottles each). This process of placing packages within a package can occur multiple times.

In the above example, the package and outer package will each have a unique code. To start, the number of products placed into a package is entered into the system (step 490) which returns a package code (step 500). Thus, the package containing 20 pill bottles receives a code. It is then determined if the package is placed into another outer package (step 510). If not, then the package is coded and this process concludes.

However, if the package will be placed within a larger package or outer package, the number of packages within the outer package is entered into a system (step 530) which provides a code for the outer package (step 520). Thus, the outer package or crate containing 50 packages receives a code. The same procedure would apply to outer packages as the outer package would receive a code and would represent all the packages and products within it.

FIG. 10 provides a workflow to activate package identifiers. When a supplier has fully prepared a package, they will activate the outer package by submitting the outer package code to the system (step 540). The system then checks to see if the package code exists or has been used (step 550). If the outer package code does not exist, then the outer package and all of its contents are activated and assigned an expiration date (step 560).

If the outer package code already exists, the package has been previously activated or has been duplicated. This scenario could occur if the supplier has made a mistake or if the outer package code has been compromised. The packages and/or products contained within the outer package can be verified by submitting their codes for activation (step 550). Once the problem has rectified, the activation process can resume when new package codes are obtained.

FIG. 11 illustrates the process of sending a package and registering that it was sent. Throughout the supply chain, the identifying code for a package will be provided by both the sender and the recipient. When a shipment is sent, the sender will supply the system with their identifying code (shipper code), the code of the intended receiver, and the package code (step 570) through their registered hardware devices.

The system examines the codes to ensure they are valid and exist in the system (step 580). If the system verifies the codes, it logs the shipment to complete the shipment (step 590) and may notify the recipient via email or SMS of its impending arrival. If one or more of the codes are not valid, the system will ask the user to reenter the codes (step 610). The user can choose to re-enter the codes (step 570) and repeat the process. If the problem persists, the user can choose to report the problem to the system which the system will log (step 600), and send the shipment to complete the process and generate an alert to the recipient.

FIG. 12 illustrates the process of receiving a package and registering that it was received. Throughout the supply chain, the identifying code for a package will be provided by both the sender and the recipient. When a shipment is received, the receiver will supply the system with their identifying code (shipper code), the code of the sender, and the package code (step 620) via their registered hardware device.

The system examines the codes to ensure they are valid and exist in the system (step 630). If the system verifies the codes, it logs the shipment to complete the receipt of the shipment (step 650). It may then generate an automatic alert to the sender that the package was received through methods such as email, SMS, or generated reports in the system. If one or more of the codes are not valid, the system will ask the user to reenter the codes (step 640). The user can choose to re-enter the codes (step 620) and repeat the process. If the problem persists, the user can choose to report the problem to the system which the system will log (step 660) which in turn can automatically notify the sender of the issue. Since the physical shipment is already at the destination, the shipment has been received and the process is complete.

FIG. 13 provides a workflow of a consumer purchasing and registering a product. Once a consumer purchases a product (step 670), they can log into the system to identify themselves. After sending the identifying code (step 680), the system will look up the identifying code to determine the status (step 690).

If the code cannot be found, the system will log the request and respond to the consumer that the code cannot be found and the product will not be registered to the logged in user. The consumer may re-enter the code to start the process again (step 700).

If the product has been reported as stolen, the system will log the request and file a stolen product report. The user will be notified that the product has been reported as stolen and the product will not be registered to the logged in user (step 700). This may also be set up to notify the manufacturer or relevant authorities automatically that their product or package has been located.

If the product code is found and the status is not stolen, the system will provide the pedigree of the product to the consumer and the product will be registered to the logged in user (step 710).

FIG. 14 provides a workflow of a consumer anonymously requesting the pedigree of a product. Once a consumer purchases a product, they can send the identifying code to the system requesting the pedigree of the product. Upon receiving the identifying code and request for pedigree, the system will determine the status of the code (step 720).

If the code cannot be found, the system will log the request and respond to the consumer that the code cannot be found and no pedigree information will be provided. The consumer may re-enter the code to start the process again (step 740).

If the product has been reported as stolen, the system will log the request and file a stolen product report. The user will be notified that the product has been reported as stolen and no pedigree information will be provided (step 740).

If the product code is found and the status is not stolen, the system will provide the pedigree of the product to the consumer (step 710).

FIG. 15 provides a workflow of a consumer reporting that a product has been stolen. When a registered product is stolen (step 750), a user can log into the system (step 760) and enter the product code for the product that has been stolen (step 770). The system will determine if this product code has been registered to the logged in user (step 780). If the product has been registered to the user, then the status of the product becomes stolen and a stolen product reports is created (step 800) and can be sent to the proper authorities via email, SMS, or generated report. If the product code cannot be found or is not registered to the user, then an error report is created and the user is notified that the product cannot be reported as stolen (step 790). The user may re-enter the product code in the case when the product code was erroneously entered earlier.

FIG. 16 illustrates the process taken to register a product when the original consumer sells it to another consumer. Upon original purchase of the product (step 810), the consumer would log into the system and register themselves and the product under their name. Should they decide at any point in time to sell or give the product to another consumer, they will be able to show the potential new purchaser the full pedigree of the product that would trail from the manufacturer all the way to them. This would in turn give the potential buyer confidence that the product is in fact authentic and lead to the secondary purchase (step 820). The new owner of the product would then need to update the pedigree and register it under their name. This would first require a release from the original owner who would change the name in system to the new owner (step 830) and give them the access rights to update all of their pertinent information and fully register the product under their ownership (step 840).

FIG. 17 provides a pedigree report generated by the system showing that the package traveled throughout the supply chain with no violations. The assigned Product Code (step 1010) and Product Description (step 1020) are given at the top of all pedigree reports to denote what the report is in reference to. The pedigree report in every instance begins with the Product/Package Code column (step 1060) listing the origin address of the shipment. The subsequent rows and columns will show the address that the shipment is being sent from (step 1030), where it is being sent to (step 1040), and where it was actually received (step 1050). This provides confidence at every level of the supply chain that the shipment has a clean pedigree as every origin and destination address matches its intended destination and origin and there is no violation listed (step 1070).

FIG. 18 provides a pedigree report in the same format as FIG. 17 but with a violation. The address that one of the shipments was scheduled to be sent to (step 2010) is different from where it was actually received (step 2020). Because of this inconsistency, a violation is generated (step 2030) and denoted in the column with the corresponding row FIG. 19 is a representation of a pedigree report similar to that of FIG. 18 with a different type of violation. The recipient address of the first shipment (step 3010) is different from the sent from address of the second shipment (step 3020). This inconsistency represents a clear violation in that is being sent from a place where it was never received and results in the violation message being generated (step 3030).

FIG. 20 illustrates the process of repackaging a product and how it is noted within the pedigree report. Under the Product/Package Code column (step 4010), the origin information of the shipment is listed. There are no discrepancies amongst any of the addresses throughout the pedigree but when it reaches the last recipient the Product/Package code is changed (step 4020). This change is caused by the product or package being repackaged and assigned a new package code. This repackaging generates a message shows that the product was repackaged and placed into a larger package to go out for shipping to another recipient. It falls upon the sender of the package who is repackaging the products to update the system accordingly to maintain the validity of the pedigree reports and make sure the products are accurately tracked and accounted for.

FIG. 21 illustrates the repackaging process of a product in the same format to that of FIG. 20 but with two occurrences of repackaging. The original product becomes repackaged into a larger crate containing 100 items (step steps 5010) after the first shipment and again repackaged after the third shipment into just a box with 1 other item (step 5020). The action of updating the system upon repackaging would belong to the sender who is doing the repackaging to make sure that the products are appropriately accounted for.

FIG. 22 represents a hardware configuration diagram in accordance with one embodiment of the present invention. Many different hardware configurations can be used with this invention. One such example is represented by FIG. 22: Report of Hardware which shows several individual user entities 900 (e.g. manufactures, consumers, shippers, etc.) receiving views of the data 920 and reports 910. These views of the data 920 and reports 910 are produced when a user entity 900 transmits requests for information or changes to information (e.g. entering data about ownership or receiving/shipping a product). The requests are made over an electronic network 930, such as the interne, and are processed by an application server 940 that communicates with a database server 950. Since there could be many people asking for data the application server could be clustered and/or an application pool could be utilized. Also, since there could be a tremendous amount of data stored, the database can also be clustered. It is likely data described in this invention would reside on more than one hard drive. The application server 940 and the database server 950, are collectively referred to as the "central repository" discussed above, and may also be referred to as an "administration computer."

FIG. 23 represents an entity configuration in accordance with one embodiment of the present invention. Many different entity and database configurations can be used with this invention. One example, FIG. 23, describes the entities and fields of the supply chain tracking system which is comprised of 5 entities. The name of each entity appears at the top of each table and the key fields of each entity are represented in the table and their corresponding attribute types are noted. The attribute type UID means unique identifier.

The Supplier entity (step 6010) is comprised of 3 fields. The Supplier Code (step 6020) uniquely identifies the supplier within the system and enables the supplier entity to create relationships with other entities. The Name field (step 6030) is the name of the supplier while the Address field (step 6040) represents the address of the supplier that appears in the name fields.

The Device entity (step 6050) is comprised of 5 fields. The Device entity (step 6050) has a one-to-many relationship with the Supplier entity (step 6010). This means that a Supplier has one or more Devices and the relationship is created by adding the Supplier Code (step 6020) value from the Supplier entity (step 6010) into Supplier Code (step 6070) in the Device entity (step 6050). Each Device has a unique code which is represented by the Device Code field (step 6060). The Type field (step 6080) designates the type of device being used such as UFC scanner, mobile phone, RFID scanner, software, etc. The Registered filed (step 6090) is a Boolean value that is set to True when the device has completed the registration process. If the device has not been registered, the value will be false. The Date Last Used field (step 6100) will have the information pertaining the last time the device interacted with the central repository.

The Product entity (step 6110) is comprised of 4 fields. The Product entity (step 6110) has a one-to-many relationship with the Supplier entity (step 6010). This means that a Supplier has one or more Products and the relationship is created by adding the Supplier Code (step 6020) value from the Supplier entity (step 6010) into Supplier Code (step 6130) in the Product entity (step 6110). Each Product has a unique code which is represented by the Product Code field (step 6120). The Description field (step 6140) describes the product and may include information such as the product name, dimensions, weight, color, etc. The Date Created field (step 6150) will have the information pertaining when the Product was added to the central repository.

The Package entity (step 6160) is comprised of 4 fields. The Package entity (step 6160) has a one-to-many relationship with the Supplier entity (step 6010). This means that a Supplier has one or more Packages and the relationship is created by adding the Supplier Code (step 6020) value from the Supplier entity (step 6010) into Supplier Code (step 6180) in the Package entity (step 6160). Each Package has a unique code which is represented by the Package Code field (step 6170). The Description field (step 6190) describes the Package and may include information such as the product count contained in the package, dimensions, weight, color, etc. The Date Created field (step 6200) will have the information pertaining when the Package was added to the central repository.

An important relationship exists between the Product entity (step 6110) and the Package entity (step 6160). When a package contains one or more products, those products contained within the package are related. In addition, a package may contain other packages which contain products. These recursive relationships enable the central repository to track products or packages even if they have been repacked in the supply chain.

The Supply Chain Tracking entity (step 6210) is comprised of 8 fields. Each record added to the Supply Chain Tracking entity (step 6210) is assigned a unique identifier in the Supply Chain Tracking field (step 6220). The Supply Chain Tracking entity (step 6210) has a one-to-many relationship with the Device entity (step 6050). This means that a Device may enter many records into the Supply Chain Tracking entity (step 6210). When a record in the Supply Chain Tracking entity (step 6210) is added, the Device Code (step 6060) from the Device entity (step 6050) in entered into Device Code field (step 6230) in the Supply Chain Tracking entity (step 6210). In addition to the Device Code field (step 6230), the Supplier Code field (step 6240) will also be added to the Supply Chain Tracking entity (step 6210) by copying the Supplier Code field (step 6070) from the same record where the Device Code field (step 6060) was found in the Device entity (step 6050). The Product Code field (step 6250) and Package Code field (step 6260) represent the product or package that was communicated by the Device. The Product Code field (step 6250) and Package Code field (step 6260) are mutually exclusive, meaning that only one of these fields will have a value for a record in the Supply Chain Tracking entity (step 6210). If a Product Code value in the Product Code field (step 6250) is entered, the Product Code value must also exist in Product Code field (step 6120) of the Product entity (step 6110).

If a Package Code value in the Package Code field (step 6260) is entered, the Package Code value must also exist in Package Code field (step 6170) of the Package entity (step 6160). Nonetheless, the supplier may be any supplier in the system, and not the one that originally created the product code or package code. The Transaction Type field (step 6270) will contain one of two values: sending or receiving. When a product or package is being sent to another supplier, the Transaction Type field (step 6270) will have the value of sending and the intended recipients' Supplier Code (step 6020) from the Supplier entity (step 6010) will be added to the Sent to Supplier Code field (step 6280) in the Supply Chain Tracking entity (step 6210). When a product or package is received by a supplier, the Transaction Type field (step 6270) will have the value of receiving and the Sent to Supplier Code field (step 6280) will be blank. The Date Created field (step 6290) will have the information pertaining when the Package was added to the central repository.

FIG. 24 represents an entity relationship diagram configuration in accordance with one embodiment of the present invention. Many different entity and database configurations can be used with this invention. One example, FIG. 24, describes the relationships of the entities in the supply chain tracking system which is comprised of 5 entities. The name of each entity appears at the top of each box representing each entity. The entities in the diagram are Supplier (step 6010), Device (step 6050), Product (step 6110), Package (step 6160), and Supply Chain Tracking (step 6210). A full description of these entities and their fields can be found in FIG. 23.

The relationships between these entities may be one-to-many or many-to-many. These relationship are defined by the lines connecting the entities and the numbers at each of ends of those lines. When a 1 appears (step 6330), it means that one of the entity the 1 is next to is related to the entity at the other side of the line. When a 0 ... * appears (Step 6310), it means that many of the entity the 0 ... * is next to is related to the entity at the other side of the line. When a 1 ... * appears (Step 6320), it means that one or more of the entity the 1 ... * is next to is related to the entity at the other side of the line.

The present invention may be used for supply chain tracking of any type of product or package, including medical products (e.g., drugs, supplies) and industrial products.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer(s) may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method for tracking the distribution of a product or package through a supply chain, the supply chain having multiple supply chain entities that successively receive the product or package, the method comprising:
   (a) providing an administration computer that communicates with each of the multiple supply chain entities regarding product or package distribution information, the administration computer including a database that stores:
      (i) a plurality of supplier codes, each supplier code being associated with one of the supply chain entities,
      (ii) one or more unique device identifiers associated with each of the supply chain entities, the device identifier identifying a device that the supply chain entity uses to communicate with the administration computer, wherein the device is a registered piece of hardware having an associated SMS number that is the unique device identifier for the device, and
      (iii) a unique product or package identifier associated with each product or package that is released into the supply chain;
   (b) electronically communicating from the supply chain entities to the administration computer via SMS messages sent by the respective devices at the supply chain entities whenever the supply chain entities send a product or package to a successive supply chain entity in the supply chain or receive a product or package from a previous supply chain entity in the supply chain, the communication including:
      (i) one of the unique device identifiers of a device of the supply chain entity that was used for the electronic communication, the unique device identifier of the device being the SMS number of the device,
      (ii) the unique product or package identifier of the product or package being sent or received, and
      (iii) the supplier code that the supply chain entity either (A) sends the product or package to, or (B) has received the product or package from; and
   (c) detecting, by the administration computer using the electronically communicated information and the database information, for supply chain entities that receive products or packages whether:
      (i) the supplier code of the supply chain entity that has received a product or package matches an expected supplier code provided by the supply chain entity that sent the product or package,
      (ii) the supplier code of the supply chain entity that has sent the product or package matches an expected supplier code provided by the supply chain entity that received the product or package, and
      (iii) whether the unique product or package identifier of the received product or package matches an expected unique product or package identifier,
   the expected supplier code and expected unique product or package identifier being the supplier code and the unique product or package identifier that an immediately preceding supply chain entity in the supply chain has communicated to the administration computer when sending out the product or package, wherein the supplier code of the supply chain entity that receives the product or package is obtained from the unique device identifier of the supply chain entity that receives the product or package, and wherein the supplier code of the supply chain entity that sends the product or package is obtained from the unique device identifier of the supply chain entity that sends the product or package.

2. The method of claim 1 further comprising:
   (d) electronically generating an alert if it is detected that:
      (i) the supplier code of the supply chain entity that has received a product or package does not match an expected supplier code, or (ii) the unique product or package identifier of the received product or package does not match an expected unique product or package identifier.

3. The method of claim 1 further comprising:
(d) detecting, by the administration computer, for supply chain entities that send products or packages whether:
(i) the supply chain entity that sends the product or package properly received the product or package from an immediately preceding supply chain entity in the supply chain, or
(ii) the supply chain entity has previously generated a new unique product or package identifier for the product or package, and that the new unique product or package identifier has been previously associated with a product or package that the supply chain entity has properly received from an immediately preceding supply chain entity.

4. The method of claim 1 further comprising:
(d) electronically generating an alert if it is detected that:
(i) the supply chain entity that sends the product or package did not properly receive the product or package from an immediately preceding supply chain entity in the supply chain, or
(ii) the supply chain entity has previously generated a new unique product or package identifier for the product or package, and that the new unique product or package identifier has been previously associated with a product or package that the supply chain entity has not properly received from an immediately preceding supply chain entity.

5. The method of claim 1 wherein the product or package contains medication.

6. An apparatus for tracking the distribution of a product or package through a supply chain, the supply chain having multiple supply chain entities that successively receive the product or package, the apparatus comprising:
(a) a plurality of devices, each device being located at one of the supply chain entities, each device having a unique device identifier, each device configured to electronically communicate information from its supply chain entity regarding distribution of a product or package;
(b) an application server including a computer processor that communicates with each of the multiple supply chain entities regarding product or package distribution information; and
(c) a database server including a database that stores:
(i) a plurality of supplier codes, each supplier code being associated with one of the supply chain entities,
(ii) one or more unique device identifiers associated with each of the supply chain entities, the device identifier identifying a device that the supply chain entity uses to communicate with the application server, wherein the device is a registered piece of hardware having an associated SMS number that is the unique device identifier for the device, and
(iii) a unique product or package identifier associated with each product or package that is released into the supply chain,
wherein the respective devices at the supply chain entities electronically communicate from the supply chain entities to the application server via SMS messages whenever the supply chain entities send a product or package to a successive supply chain entity in the supply chain or receive a product or package from a previous supply chain entity in the supply chain, the communication including:
(i) one of the unique device identifiers of a device of the supply chain entity that was used for the electronic communication, the unique device identifier of the device being the SMS number of the device,
(ii) the unique product or package identifier of the product or package being sent or received, and
(iii) the supplier code that the supply chain entity either (A) sends the product or package to, or (B) has received the product or package from, and
wherein the application server detects using the electronically communicated information and the database information, for supply chain entities that receive products or packages whether:
(i) the supplier code of the supply chain entity that has received a product or package matches an expected supplier code provided by the supply chain entity that sent the product or package,
(ii) the supplier code of the supply chain entity that has sent the product or package matches an expected supplier code provided by the supply chain entity that received the product or package, and
(iii) whether the unique product or package identifier of the received product or package matches an expected unique product or package identifier,
the expected supplier code and expected unique product or package identifier being the supplier code and the unique product or package identifier that an immediately preceding supply chain entity in the supply chain has communicated to the application server when sending out the product or package, wherein the supplier code of the supply chain entity that receives the product or package is obtained from the unique device identifier of the supply chain entity that receives the product or package, and wherein the supplier code of the supply chain entity that sends the product or package is obtained from the unique device identifier of the supply chain entity that sends the product or package.

7. The apparatus of claim 6 wherein the application server further electronically generates an alert if it is detected that:
(i) the supplier code of the supply chain entity that has received a product or package does not match an expected supplier code, or
(ii) the unique product or package identifier of the received product or package does not match an expected unique product or package identifier.

8. The apparatus of claim 6 wherein the application-server further detects, for supply chain entities that send products or packages, whether:
(i) the supply chain entity that sends the product or package properly received the product or package from an immediately preceding supply chain entity in the supply chain, or
(ii) the supply chain entity has previously generated a new unique product or package identifier for the product or package, and that the new unique product or package identifier has been previously associated with a product or package that the supply chain entity has properly received from an immediately preceding supply chain entity.

9. The apparatus of claim 6 wherein the application server further electronically generates an alert if it is detected that:
(i) the supply chain entity that sends the product or package did not properly receive the product or package from an immediately preceding supply chain entity in the supply chain, or
(ii) the supply chain entity has previously generated a new unique product or package identifier for the product or package, and that the new unique product or package identifier has been previously associated with a product or package that the supply chain entity has not properly received from an immediately preceding supply chain entity.

* * * * *